(12) United States Patent
Schmotzer et al.

(10) Patent No.: US 11,269,807 B2
(45) Date of Patent: Mar. 8, 2022

(54) METHOD AND SYSTEM FOR DECONSTRUCTING AND SEARCHING BINARY BASED VEHICULAR DATA

(71) Applicant: Ford Motor Company, Dearborn, MI (US)

(72) Inventors: John Schmotzer, Canton, MI (US); Yao Ge, Northville, MI (US); Pol Llado, Royal Oak, MI (US); Taylor Hawley, Detroit, MI (US)

(73) Assignee: Ford Motor Company, Dearborn, MI (US)

( * ) Notice: Subject to any disclaimer, the term of this patent is extended or adjusted under 35 U.S.C. 154(b) by 600 days.

(21) Appl. No.: 15/902,891

(22) Filed: Feb. 22, 2018

(65) Prior Publication Data
US 2019/0258727 A1    Aug. 22, 2019

(51) Int. Cl.
| | |
|---|---|
| *G06F 7/00* | (2006.01) |
| *G06F 17/30* | (2006.01) |
| *G06F 16/14* | (2019.01) |
| *G06F 16/31* | (2019.01) |
| *G06F 40/242* | (2020.01) |

(52) U.S. Cl.
CPC ............ *G06F 16/148* (2019.01); *G06F 16/31* (2019.01); *G06F 40/242* (2020.01)

(58) Field of Classification Search
CPC ......... G06F 17/30106; G06F 17/30613; G06F 17/2735
USPC ........................................................ 707/706
See application file for complete search history.

(56) References Cited

U.S. PATENT DOCUMENTS

| | | | | |
|---|---|---|---|---|
| 7,630,801 | B2* | 12/2009 | Giles ..................... | G06F 21/572 |
| | | | | 701/115 |
| 8,731,977 | B1* | 5/2014 | Hardin .................. | G06Q 40/08 |
| | | | | 705/4 |
| 9,021,384 | B1 | 4/2015 | Beard et al. | |
| 9,201,930 | B1 | 12/2015 | Merg | |
| 9,672,497 | B1* | 6/2017 | Lewis .................... | G06Q 10/20 |
| 2002/0169764 | A1* | 11/2002 | Kincaid ................ | G06F 16/951 |

(Continued)

FOREIGN PATENT DOCUMENTS

CN           105260389           1/2016

OTHER PUBLICATIONS

Connected Car, the Teneo Platform, Sep. 2017, available at URL http://www.artificial-solutions.com/natural-language-interaction-solutions/connected-car.

*Primary Examiner* — Binh V Ho
(74) *Attorney, Agent, or Firm* — Burris Law, PLLC

(57) ABSTRACT

The present disclosure is directed toward a method and system for deconstructing and searching binary based vehicular data. The method includes extracting a vehicle filename metadata for one or more vehicular files; parsing data of the vehicular files to generate categorized objects based on a vehicular data dictionary for the vehicular files; associating each of the categorized objects with a respective vehicle filename metadata; storing vehicular documents indicative of the categorized objects with associated vehicle filename metadata in a database system; building a query based on a search input acquired by way of a search interface being displayed; and transmitting search results in response to the search input. The vehicular data dictionary defines multiple terms indicative of decoding logic provided in the vehicular files.

18 Claims, 17 Drawing Sheets

(56) References Cited

U.S. PATENT DOCUMENTS

| | | | |
|---|---|---|---|
| 2004/0148073 A1* | 7/2004 | Hawig | B60R 25/00 |
| | | | 701/36 |
| 2004/0215378 A1* | 10/2004 | Hedges | G06F 11/2268 |
| | | | 701/33.4 |
| 2006/0247831 A1* | 11/2006 | Shimokoshi | G07C 5/008 |
| | | | 701/31.4 |
| 2008/0052292 A1* | 2/2008 | Hallowell | G06Q 30/0601 |
| 2008/0140706 A1* | 6/2008 | Kahn | G06F 16/58 |
| 2008/0306651 A1* | 12/2008 | Davis | H04L 67/06 |
| | | | 701/33.4 |
| 2009/0271804 A1* | 10/2009 | Nagano | F02D 41/26 |
| | | | 719/318 |
| 2011/0099163 A1* | 4/2011 | Harris | G06Q 10/10 |
| | | | 707/723 |
| 2011/0184946 A1* | 7/2011 | Hennum | G06F 16/3338 |
| | | | 707/728 |
| 2012/0105637 A1* | 5/2012 | Yousefi | H04B 1/3822 |
| | | | 348/148 |
| 2013/0054563 A1* | 2/2013 | Heidasch | G06F 16/2228 |
| | | | 707/711 |
| 2013/0325337 A1* | 12/2013 | Rudenstine | G01C 21/3484 |
| | | | 701/527 |
| 2014/0040992 A1* | 2/2014 | Koide | H04L 63/06 |
| | | | 726/4 |
| 2014/0136187 A1 | 5/2014 | Wolverton et al. | |
| 2015/0348339 A1* | 12/2015 | Ohno | G07C 5/0808 |
| | | | 701/32.7 |
| 2016/0328890 A1* | 11/2016 | Keane | G07C 5/0808 |
| 2017/0177710 A1 | 6/2017 | Burlik | |
| 2019/0213605 A1* | 7/2019 | Patel | G06N 5/048 |

\* cited by examiner

```
200 {
  "msg_name": "CarInfo_2",
  "module_source": "BCM",
  "msg_length": 8,
  "signals": [
    "Parklamp_Status",
    "Ignition_Status",
    "Remote_Start_Status",
    "Key_Type",
    "Key_In_Ignition_Stat",
    "Hood_Status",
    "Dimming_Lvl",
    "TurnLightLeft_Stat",
    "TurnLightRight_Stat"
  ]
}

0x3B3

202 {
  "msgID": 947,
  "module_source": "BCM",
  "idMeta": "947@26",
  "SED_Lookup": [
    "Off",
    "On",
    "Unknown",
    "Invalid"
  ],
  "sig_name": "Parklamp_Status",
  "start": 3,
  "sig_length": 2,
  "range": [
    0,
    3
  ],
  "factor": 1,
  "offset": 0,
  "unit": "SED",
  "modules": [
    "GWM"
  ]
}
```

FIG. 2A

204 {
```xml
<DID ID='did_FD0A'>
<NAME>Fail counters</NAME>
<NUMBER>0xFD0A</NUMBER>
<BYTE_SIZE>3</BYTE_SIZE>
<DID_TYPE>packeted</DID_TYPE>
<ACCESS_PARAMETERS>
<READABLE SERVICE_REFS='service_22' SESSION_REFS='session_01 session_03'/>
<WRITEABLE SERVICE_REFS='service_2E' SESSION_REFS='session_03' SECURITY_REFS='security_level_2'/>
</ACCESS_PARAMETERS>
<SUB_FIELD ID='did_FD0A_subfield_1'>
<NAME>FET short counter</NAME>
<DESCRIPTION>KAM flag FETShortCtr for Heater</DESCRIPTION>
<LEAST_SIG_BIT>8</LEAST_SIG_BIT>
<MOST_SIG_BIT>23</MOST_SIG_BIT>
<DATA_DEFINITION>
<DATA_TYPE>bytes</DATA_TYPE>
<DEFAULT_VALUE>0x00</DEFAULT_VALUE>
</DATA_DEFINITION>
</SUB_FIELD>
<SUB_FIELD ID='did_FD0A_subfield_2'>
<NAME>EyeQ reset counter</NAME>
<DESCRIPTION>EyeQ reset counter</DESCRIPTION>
<LEAST_SIG_BIT>0</LEAST_SIG_BIT>
<MOST_SIG_BIT>7</MOST_SIG_BIT>
<DATA_DEFINITION>
<DATA_TYPE>bytes</DATA_TYPE>
<DEFAULT_VALUE>0x00</DEFAULT_VALUE>
</DATA_DEFINITION>
</SUB_FIELD>
</DID>
```

FIG. 2B

| Abbreviation | Definition |
|---|---|
| A123 | Ford Explorer |
| B867 | Lincoln Town Country |
| P153 | Ford Mustang |
| ... | ... |
| D123 | Lincoln MKS |
| ... | ... |
| RPM | rotation per minute |
| ENG | engine |

FIG. 4

| Msg Indicator | Msg ID | Msg Name | Msg. Length | Originating ECU |
|---|---|---|---|---|
| BO, bo, Bo | 250 | VehicleStatus | 8 | BCU |
| DCI, Dci, dci | 275 | EngineSpeed | 4 | ECU |
| Lw, LW, lw | 300 | EngineRunTime | 6 | CCU |
| | 450 | ClimateTempSensor | | PCU |
| | 500 | | | |

| Abbreviated Expression | Full Expression | Abbreviation | Synonym |
|---|---|---|---|
| acceleration | Acceleration | Acc | |
| Acceleration gravity | Accelerationgravity | GR | |
| Alert | Alert | Alrt | alarm |
| behave | Behave | Bhav | behavior |
| camshaft | Camshaft | Cmsft | |
| charger | Charger | Chrgr | |
| drive | Drive | Drv | driver |
| engine | Engine | eng | |
| fault | Fault | Falt | faulty |
| heater | Heater | Heat | heated |
| message | Message | Msg | |
| mode | Mode | Mde | |
| up | Up | Up | upper |
| vehicle | Vehicle | Veh | |

FIG. 10A

| Program | Synonym |
|---|---|
| AX07 | Focus, 2005 AX07, focus,FOCUS |
| C132 | Mondeo,2005 C132, mondeo, MONDEO |
| B217 | Freestyle,2005 B217,freestyle,FREESTYLE |
| A278 | Five hundred, Five Hundred, 2005 A278, five hundred, FIVE HUNDRED |
| D342 | Montego, 2005 D342, montego, MONTEGO |
| FX20 | Ranger, 2005 FX20, ranger, RANGER |
| T167 | Mustang, 2005 T167, Pony, pony,mustang,MUSTANG |
| C233 | Expedition,2005 C233, expedition, EXPEDITION |
| G212 | Navigator, 2005 G212, navigator, NAVIGATOR |
| U388 | Escape HEV, Escape HEV, 2005 U388,escape hev, ESCAPE HEV |

FIG. 10B

METHOD AND SYSTEM FOR DECONSTRUCTING AND SEARCHING BINARY BASED VEHICULAR DATA

FIELD

The present invention relates to vehicular data, and more particularly, to a system for processing and searching vehicular data.

BACKGROUND

The statements in this section merely provide background information related to the present disclosure and may not constitute prior art.

Vehicles generate a substantial amount of data that captures the interaction of the passengers with the vehicle and the external environment. Generally, a vehicle includes multiple electronic control units (i.e., ECU or controllers) that monitor and generate data unique to the function and operation of the unit. For example, a dedicated electronic control unit can be provided for controlling each of the following components/systems: engine, power steering, transmission, air-conditioning system, entertainment system, braking system, windows, and/or battery. ECUs are also known as electronic control modules (ECM).

To exchange data amongst each other, ECUs are communicably coupled via a vehicular network, such as a control area network (CAN) bus, which is a vehicle communication bus standard. In addition to ECUs, other vehicular devices, such as sensors, may transmit data to ECUs via the CAN bus. Data sent through CAN (i.e., CAN data) is sent in bit encoded packet called a CAN frame and contains eight bytes of data in the data payload field of the CAN frame. CAN uses a bit-wise arbitration in hardware to negotiate which message is sent in the event that multiple message are sent at once. The messages are broadcasted, for example, periodically (time and/or event based) or based on a request from another message.

A single CAN message may include multiple signals. For example, an engine control unit that receives measurements from multiple sensors transmits the measurements to other ECUs as signals within a CAN message. In another example, a parking assist control unit may activate a rear camera by transmitting a signal to the camera via a CAN message. The data payload may contain more than 30 signals encoded into the possible 64 bits, meaning that the information that details the exact bits that define the signal are needed for decoding the message. Each signal may include state-encoded data or a bit-encoded value which can be factored and offset.

In addition to normally broadcasted data, an ECU can also generate diagnostic data after, for example, detecting an abnormality or performing a diagnostic routine. The diagnostic data is generally accessible by an external controller using a request and response protocol (e.g., on-board diagnostics parameter identifications—OBD-II PIDs).

The vehicular data, including the CAN data and the diagnostic data, are originally optimized for the in-vehicle network, and is not comprehensible to a human. In addition, data for a specific metric, such as engine speed, may be defined differently among different vehicle platforms. That is, a CAN message for a given metric used in one vehicle platform may be different than another platform, and thus, cannot be used for other platforms. Accordingly, the process to determine what vehicle data is available on an individual vehicle is a multiple day multiple resource effort. Additionally, some individuals that are not experts in a given aspect of the vehicle have a difficult time obtaining the relevant data since they might not know the nomenclature or jargon for a specific vehicle functionality. These and other issues are addressed by the present disclosure.

SUMMARY

This section provides a general summary of the disclosure, and is not a comprehensive disclosure of its full scope or all of its features.

In one form, the present disclosure is directed toward a method that includes extracting a vehicle filename metadata for one or more vehicular files. Each of the vehicular files are configured to decode vehicular data generated by one or more electronic control units (ECUs). The method further includes parsing data of the vehicular files to generate categorized objects based on a vehicular data dictionary for the vehicular files. The vehicular data dictionary defines multiple terms indicative of decoding logic provided in the vehicular files. The method further includes associating each of the categorized objects with a respective vehicle filename metadata, storing vehicular documents indicative of the categorized objects with associated vehicle filename metadata in a database system, building a query based on a search input acquired by way of a search interface being displayed, and transmitting search results in response to the search input.

In another form, for each of the categorized object, the method further includes indexing original data provided in a categorized object with one or more searchable terms provided in a synonym datastore that defines terms provided in the vehicular files. The original data with the indexed searchable terms are stored as a vehicular document in the database system.

In yet another form, the vehicular file includes a network protocol file to decode messages transmitted on a vehicle network, and the data of the network protocol file is parsed to generate protocol objects, message objects, and signal objects, as the categorized objects.

In one form, the vehicular file includes a diagnostic file to define diagnostics performed by a given ECU among the one or more ECUs, and the data of the diagnostic file is parsed to generate data identifiers (DID) objects, diagnostic trouble code (DTC) objects, and diagnostic routine (RTN) objects, as the categorized objects.

In another form, the vehicular data dictionary includes information regarding at least the following fields provided in the vehicular files: make and model of vehicle, vehicle networks, version of vehicular file, electronic control units provided in the vehicle, message identification, message name, message length, and signal name.

In yet another form, the database system includes a plurality of databases, and the search input includes a search category filter input to select a database from among the plurality of databases and one or more keywords. Searching the database system further includes searching a selected database from among the plurality of database using the one or more keywords.

In one form, the vehicle filename metadata includes at least one of data indicative of a vehicle network that the vehicular data is transmitted on, and information identifying the vehicle having the vehicle network.

In another form, the method includes splitting the extracted vehicle filename metadata in one or more tokens, identifying a field for one or more of the tokens using the vehicular data dictionary, and saving the file metadata in association with the fields identified for each of the tokens in the database system.

In yet another form, the present disclosure is directed toward a non-transitory computer readable medium storing program instructions, that when executed by a processor of computing device, cause the computing device to perform a set of operations comprising the method.

In one form, the present disclosure is directed toward a method that includes generating, by a vehicular data search system, a vehicle file database system to store vehicular documents that include at least one of vehicle network documents or vehicle diagnostic documents. The vehicle network documents are based on at least one network protocol file that decodes vehicular data transmitted on at least one vehicle network, and the vehicle diagnostics documents are based on at least one diagnostic file that defines diagnostics performed by at least one electronic control unit (ECU) in a given vehicle. The method further includes: acquiring, by the vehicular data search system, one or more keywords from a search bar being displayed by the vehicular data search system; constructing, by the vehicular data search system, a query that includes the keywords and at least one synonym from a synonym datastore for the acquired keyword; searching, by the vehicular data search system, the vehicular documents stored in the vehicle file database system based on the constructed query; and outputting, by the vehicular data search system, one or more search results in response to the keywords. The synonym datastore defines synonyms for vehicular data provided in the network protocol file and the diagnostic file.

In another form, generating the vehicle file database system further includes: parsing, by the vehicular data search system, the network protocol file based on a vehicular data dictionary to generate vehicle network objects that include protocol objects, message objects, and signal objects; and parsing, by the vehicular data search system, the one or more diagnostic files based on the vehicular data dictionary to generate vehicle diagnostic objects that include at least one of data identifiers (DID) objects, diagnostic trouble code (DTC) objects, and diagnostic routine (DRTN) objects. The vehicular data dictionary defines multiple terms indicative of decoding logic provided in the network protocol file and the diagnostic file.

In yet another form, generating the vehicle file database system further includes: extracting, by the vehicular data search system, filename metadata for the network protocol file and the diagnostic file; pairing, by the vehicular data search system, the extracted filename metadata of the network protocol file with the respective vehicle network objects; and pairing, by the vehicular data search system, the extracted filename metadata of the diagnostic file with the respective vehicle diagnostics objects.

In one form, generating the vehicle file database system further comprises: for each of the vehicle network objects, indexing, by the vehicular data search system, original data provided in a vehicle network object with one or more searchable terms provided in the synonym datastore; and for each of the vehicle diagnostic objects, indexing, by the vehicular data search system, original data provided in a vehicle diagnostic object with one or more searchable terms provided in the synonym datastore. For the vehicle network objects, the original data with the indexed searchable terms is stored as a vehicle network document in the database system, and for the vehicle diagnostic objects, the original data with the indexed searchable terms is stored as a vehicle diagnostics document in the database system.

In another form, searching the vehicular documents further includes reconciling, by the vehicular data search system, the query with the searchable terms provided in the vehicular documents to select one or more relevant vehicular documents. The search results include the original data provided in the one or more relevant vehicular documents.

In yet another form, the vehicle file database system includes a network database for storing the vehicular network documents and a diagnostic database for storing the vehicle diagnostics documents. The method further comprises acquiring, by the vehicular data search system, a search category filter input to identify one of the network database or the diagnostic database as a desired database. The searching the vehicular documents further comprises searching, by the vehicular data search system, the vehicular documents stored in the desired database based on the constructed query.

In one form, the present disclosure is directed toward a non-transitory computer readable medium storing program instructions, that when executed by a processor of computing device, cause the computing device to perform a set of operations comprising the method.

In one form, the present disclosure is directed toward a vehicular data search system that includes a vehicular file decoder and a vehicular data search server. The vehicular file decoder is configured to generate categorized objects of a vehicular file. The categorized object includes vehicular data parsed from the vehicular file and is paired with data indicative of a vehicle filename metadata. The vehicular data search server is communicably coupled to an external computing device to receive a search input. The vehicular data search server includes a database system that stores a vehicular document for each categorized object and a synonym datastore that defines synonyms for data provided in the vehicular file. Each vehicular document includes vehicular data from the vehicular file and is indexed with one or more searchable term provided from the synonym datastore. The vehicular data search server, in response to receiving a keyword as the search input, is configured to build query, search the database system based on the query, and output search results. The query includes the keyword and at least one synonym from the synonym datastore for the acquired keyword.

In another one form, the vehicular file includes a network protocol file to decode data transmitted on a vehicle network, and the vehicular file decoder is configured to parse the data of the network protocol file and to generate protocol objects, message objects, and signal objects, as the categorized objects.

In yet another form, the vehicular file includes a diagnostic file to define diagnostics performed by a given electronic control unit (ECU) in a vehicle. The vehicular file decoder is configured to parse the data of the diagnostic file and to generate data identifiers (DID) objects, diagnostic trouble code (DTC) objects, and diagnostic routine (DRTN) objects, as the categorized objects.

In one another form, the vehicular file decoder outputs the categorized objects in JavaScript Object Notation (JSON).

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 2A illustrates an example message transmitted on a control area (CAN) network;

FIG. 2B illustrates an example of a diagnostic file;

FIG. 4 illustrates an example abbreviation dictionary in accordance with the teachings of the present disclosure;

FIGS. 6A and 6B illustrate an example of a vehicular data dictionary in accordance with the teachings of the present disclosure;

FIG. 10A illustrates an example abbreviations table for a synonym datastore in accordance with the teachings of the present disclosure;

FIG. 10B illustrate an example vehicle program identifier table for a synonym datastore in accordance with the teachings of the present disclosure;

Figure 1:
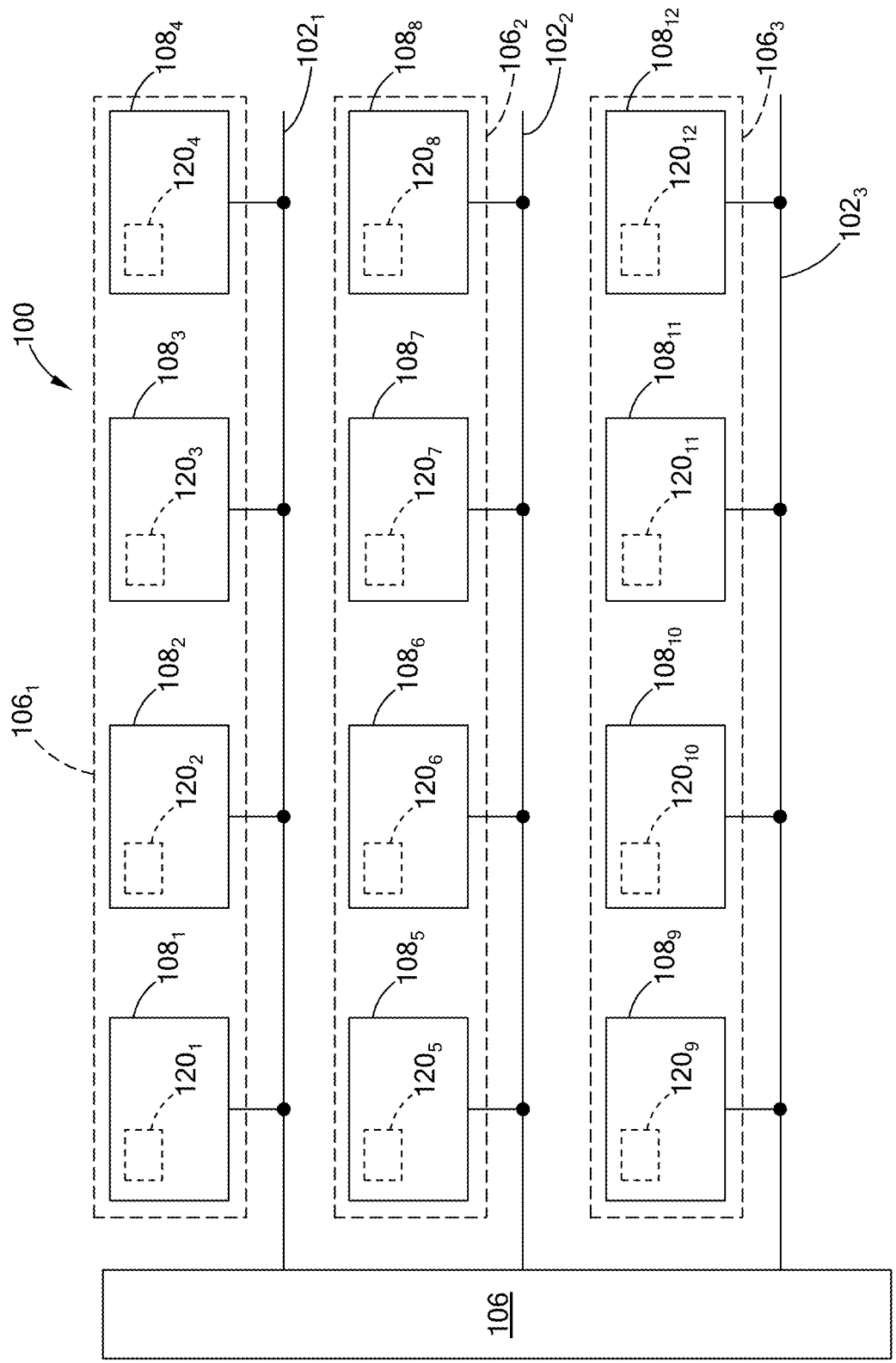
FIG. 1 is a block diagram of a vehicular network system.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure is directed towards a method and system for transforming complex binary metadata decode logic provided in vehicular files into searchable vehicular data based on natural language character strings. More particularly, the system is configured to enable natural language search functionality of binary metadata decode logic by coupling the decode logic with natural language keywords, and storing the original data in association with the natural language keyword. Accordingly, the system is able to search for the original binary decode logic using the natural language keywords associated with the logic In some applications, a vehicle includes multiple devices, such as ECUs and sensors, that exchange information by way of one or more CAN buses. For example, FIG. 1 illustrates a vehicular network system 100 that includes multiple CAN buses 102$_1$, 102$_2$, 102$_3$ (i.e., "CAN buses 102") that are connected to each other via a gateway module 104. The CAN buses 102$_1$, 102$_2$, 102$_3$ communicably couple device groups 106$_1$, 106$_2$, 106$_3$, (i.e., "device group 106"), respectively. The device group 106$_1$ includes ECUs 108$_1$, 108$_2$, 108$_3$, and 108$_4$; the device group 106$_2$ includes ECUs 108$_5$, 108$_6$, 108$_7$, and 108$_8$; and the device group 106$_3$ includes ECUs 108$_9$, 108$_{10}$, 108$_{11}$, and 108$_{12}$. The ECUs 108$_1$ to 108$_{12}$ may collectively be referred to as ECUs 108. In addition to ECUs, the device groups 106 may include other vehicular devices, such as sensors.

In one form, a given ECU is generally a computing device having a memory (e.g., ROM, RAM) and a processor that executes computer readable instructions stored in the memory. The ECU may also include a communication interface for connecting to a respective communication bus and in some application, to an external device via a wire or wireless communication link.

Rules for decoding the CAN messages transmitted on the CAN buses 102 are defined in a network protocol file, which is also referred to as a database configuration (DBC) files. Each CAN bus 102 is associated with a unique DBC file to define the CAN messages and signals transmitted within the respective device group 106. For example, FIG. 2 illustrates a CAN message 200 provided as 0x3B3 in the message. In this example, the CAN message 200 conveys data regarding at least 9 signals and other data, such as message name, the module (i.e. ECU) transmitting the CAN message and the length of the message. The CAN message of FIG. 2A is encoded into the 64 bits, and each signal may include state-encoded data or a bit encoded value which can be factored and offset. For example, FIG. 2A illustrates decoding data 202 for the "Parklamp_Status", and indicates that the signal has a length of 2 bits that can range between 0-3 with a factor of 1 and offset of 0. In the example, the message ID provided in the decoding data 202 is provided in decimal form 947 and not in hexadecimal form 0x3B3. Using the DBC file, an ECU identifies the messages it should expect and how to translate the messages.

In addition to the content within the DBC file, a filename of the DBC (i.e., a DBC filename) includes metadata to provide information regarding, for example, the vehicle, the CAN bus, the vehicle year, and/or the version. In one example, the DBC filename is provided as "CAN1CM2DMY16v29.dbc" in which "CAN1" identifies the CAN bus, "CM2D" identifies the vehicle (e.g., a vehicle program name), "MY16" indicates the model year as 2016, and "v29.dbc" identifies the version of the DBC files as version 29. The type and arrangement of the information for the DBC filename can be defined by the original equipment manufacturer (OEM).

The DBC file defines messages and signals transmitted by ECUs for a specific CAN bus and is generally unintelligible to a user. For example, MSG 1 and SG1 provided below is an example of data provided in a DBC file for decoding a message and a signal, respectively. MSG1 and SG1 each follow a specific format for conveying information that is ultimately used to decode the CAN message. Here, MSG1 follows the format: [[message indicator]]_[[message identification]] [[message name]]: [[message length]] [[originating ECU]]. Accordingly, "BO" is the message indicator, "500" is the message identification, "VehicleStatusMessage" is the message name, "8" is the message length, and "ECU" is the originating ECU, in this case an engine control unit. The signal SG1 follows the format: [[signal indicator]]_[[signal name]]:[[bit start 1 bit length info]] [[signal factor]] [[signal values]] [[signal type]] [[receiving ECU]]. Accordingly, "SG" is the signal indicator, "VehRunStat_ActI" is the signal name, "1110" is the bit start and length information, "@0+" is the signal factor, "(1,0) [0|1]" is the signal values, "SED" is the signal type, and "BCU, CCU" are the receiving ECUs.

MSG1 . . . BO_500 VehicleStatusMessage: 8 ECU

SG1 . . . SG_VehRunStat_ActI: 1|10@0+ (1,0) [0|1] "SED" BCU,CCU

In addition to CAN data, an ECU may also generate diagnostic data. For example, in one form, each of the ECUs 108 are configured to include a diagnostic module 120 (i.e., diagnostic modules $120_1$ to $120_{12}$ in FIG. 1) that performs diagnostics specific to the ECU. Diagnostic data generated by the diagnostic module 120 is accessible via an external device. For example, an engine control unit may be in communication with a service tool (e.g., an external computer) that is able to access the diagnostic data stored within the engine control unit and able to execute one or more predefined diagnostic routines.

In one form, each ECU in a vehicle is associated with a diagnostic decode file or, in other words, a diagnostic specification that is used to decode the diagnostic data generated by the diagnostic module 120. This diagnostic decode file, which may also be referred to as a diagnostic file, includes an ECU diagnostic ID for identifying the ECU having the file, data identifiers (DIDs), diagnostic trouble codes (DTCs), and diagnostic routines (RTN) performed by the ECU. The diagnostic decode file can be a multiplex diagnostic exchange format (.MDX). At times, a specific ECU installed in one vehicle may have different diagnostic specification than the same type of ECU installed in another vehicle. For example, a diagnostic file for an engine ECU disposed in a first vehicle includes the same fields (i.e., ECU diagnostic ID, DID, DTC, and diagnostic RTN), but the actual information provided for those fields may be different from another engine ECU disposed in a second vehicle. Such variation may also be present across vehicle of the same make and model. FIG. 2B provides an example of a diagnostic file 204 that provides information regarding a DID.

In one form, the filename of the diagnostic file for a given ECU includes metadata that identifies the vehicle and the ECU. More particularly, in one form, the filename for each diagnostic file is constructed to includes certain information and arranged in accordance with a predefined format. For example, the filename may be configured to have the following format: [[Model Year]]_[[Vehicle Program]]/[[ECU]]-DIAG-SPEC.mdx. Based on this predefined format, a diagnostic file for a body control unit (i.e., BCU) in a 2015 Explorer can be provided as "2015-A123-BCU-DIAG-SPEC.mdx" in which "2015" is the model year, "A123" is a vehicle program name assigned to the Explorer, and "BCU-DIAG-SPEC" indicates the file is a diagnostic specification (i.e., diagnostic file) for a BCU provided in the 2015 Explorer. In another form, the filename may be configured to include specific information, but the arrangement of the information may vary. Accordingly, in lieu of 2015-A123/BCU-DIAG-SPEC.mdx, the filename may be provided as "A123/2015/BCU-DIAG-SPEC.mdx."

Figure 3:
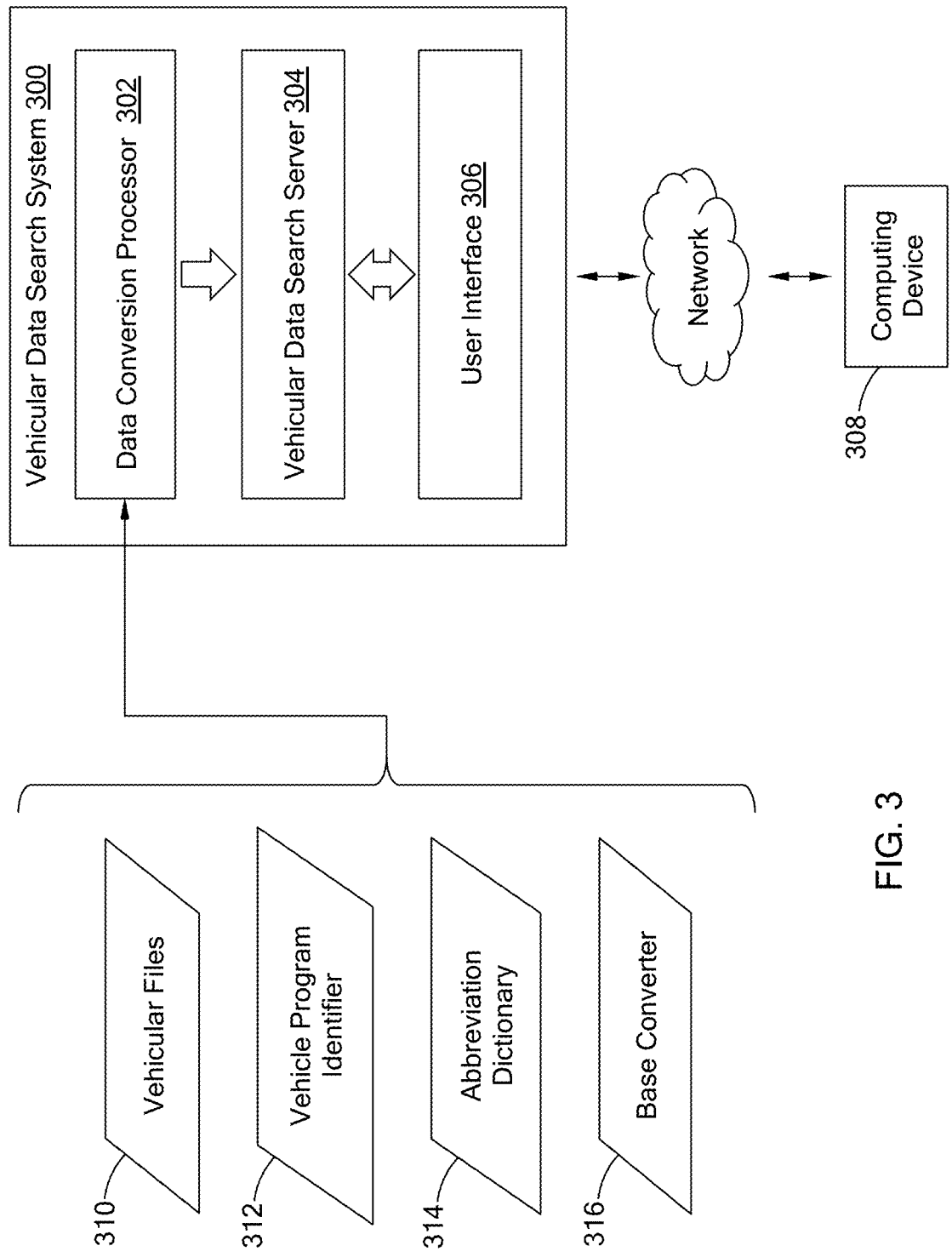
FIG. 3 is a block diagram of a vehicular data search system in accordance with the teachings of the present disclosure.

Referring to FIG. 3, a vehicular data search system 300 of the present disclosure is configured to process vehicular files, such as the DBC files and diagnostic decode files, to obtain the original data strings and pair it with additional information (i.e., metadata). The system 300 then manages the processed vehicular files in a defined file system that is structured in such a way to support granular decoding while optimizing findability. In one form, the vehicular data search system 300 includes a data conversion processor 302, a vehicular data search server 304, and a user interface module 306. As described further herein, the data conversion processor 302 transforms the decode logic into categorized objects, and the vehicular data search server (i.e., search server 304") indexes the categorized object with natural language terms that best represent the object (i.e., synonyms), and stores the original decode logic with the synonyms in a database system. The search server 304 executes a search of the database system based on a query submitted by the user interface module 306, which interfaces with an external computing device 308 operated by a user.

In one form, the system 300 is implemented by way of one or more servers. For example, the system 300 includes multiple distributed servers or cloud-based servers or services. Accordingly, the system 300 includes at least one processor or central processing unit (CPU), and memory (RAM/ROM) for storing computer readably instructions executed by the processor. The system 300 also includes a communication or network interface for communicating with other computers or systems over a network. In one form, the system 300 is implemented as a full-stack web application in which the system exists as a front-end that is used in a browser and issues application programming interface (API) requests to a set of microservices running on a cloud-based server system. The server side code may run on a Linux server and can run on other suitable computer environment.

The data conversion processor 302 receives various types of data and transforms the data to a searchable format for the search server 304. As part of the system 300, the data conversion processor 302 receives the data via the network from, for example, an external system, database, and/or server. In one form, the data conversion processor 302 receives vehicular files 310, which include DBC files and diagnostic files for one or more vehicles. In addition to the vehicular files 310, the data conversion processor 302 acquires supplemental information that is used by the search server 306 to expand a search query. For example, the supplemental information includes a vehicle program identifier 312, an abbreviation dictionary 314, and a base converter 316.

The vehicle program identifier 312 provides the vehicle programs that may be cited in the vehicular files. More particularly, an original equipment manufacturer (OEM)) may have a defined internal nomenclature (i.e., a vehicle program name) for identifying a vehicle. In one form, the information used in the vehicle program identifier 312 is used to identify a character string as a vehicle program. The abbreviation dictionary 314 defines abbreviation, such as the vehicle program, that may be used in the vehicular files or even provided as a search field. The abbreviation dictionary 314 may be configured in various suitable ways to define different abbreviations. For example, FIG. 4 illustrates an abbreviation dictionary 400 that is provided as a look-up table. In the example, abbreviations 402 are example vehicle program names and definitions 404 identify the make and model associated with vehicle program name. Also, abbreviations 406 and definitions 408 are example technical abbreviations and the respective definition. The abbreviation dictionary 400 may include other information and should not be limited to the examples provided.

The base converter 316 converts numerical coded data strings to different base formats. Specifically, as described above, a CAN message transmits data in 8-bytes (i.e., 64 bits), and are generally represented in binary (base-2), decimal (base-10), and/or hexadecimal (base-16). For example, a message in its raw form can be provided as 10000001010 in binary, 1034 in decimal, to 0x40A in hexadecimal. The base converter 316 is operable to convert the bytes of data between the different bases. The base converter 316 may be provided in various suitable ways, such as a look-up table or even a computer program executable by a processor.

Figure 5:
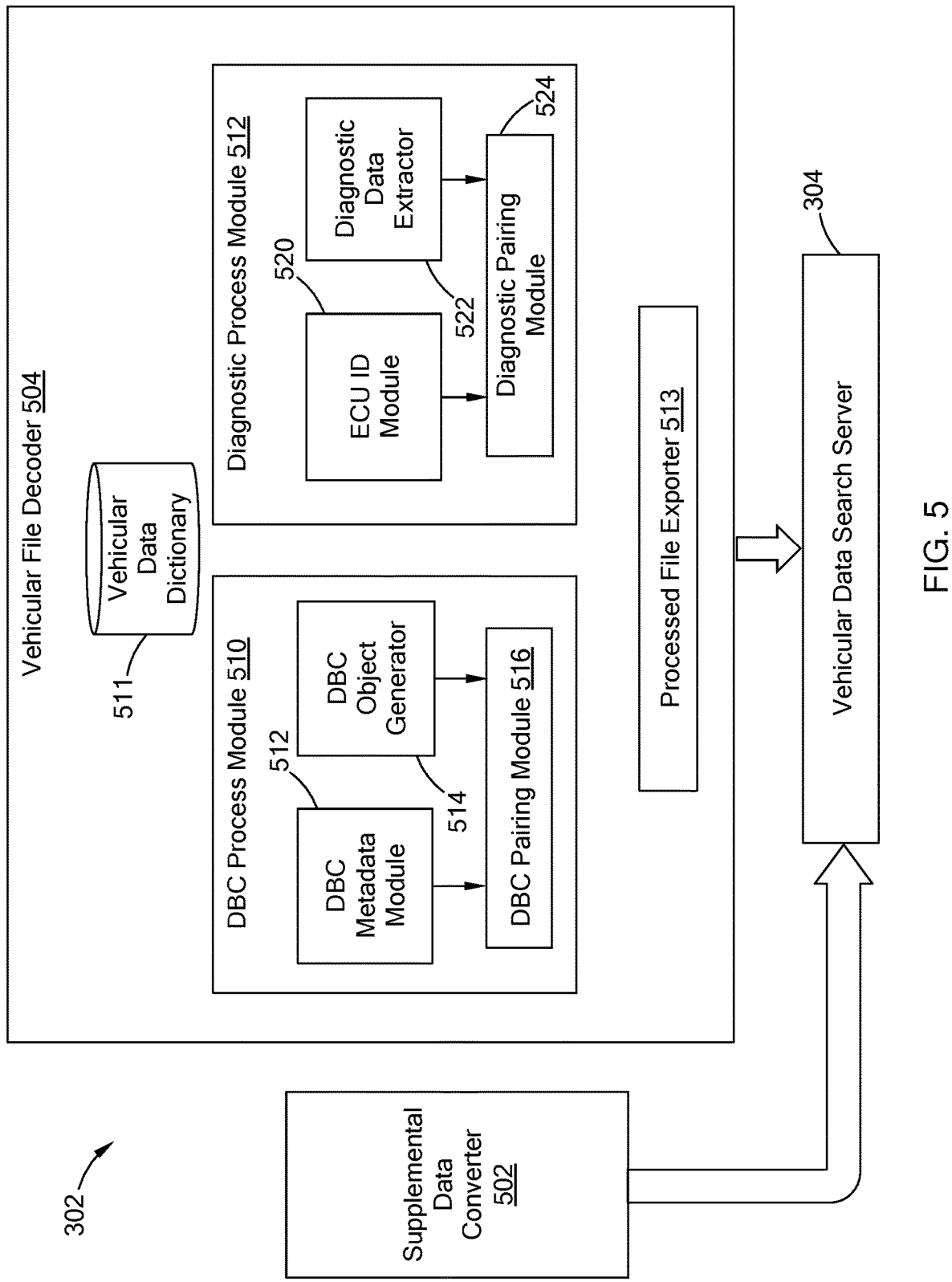
FIG. 5 is a block diagram of a data conversion processor in accordance with the teachings of the present disclosure.

Referring to FIG. 5, the data conversion processor 302 is configured to include a supplemental data converter 502 and a vehicular file decoder 504. The supplemental data converter 502 converts the supplemental information to a synonym format specified by the search server 306. More particularly, the supplemental information, such as the vehicle program identifier 312, the abbreviation dictionary 314, and the base converter 316, are used as part of a synonymy dictionary provided by the search server 306 to expand the search terms used in query. In one form, the supplemental data converter 502 substitutes the dictionary terms for the seed terms. For example, with respect to the vehicle program, the program code is used as the base term and then all the alternative terms for that code are included during indexing. In one form, the supplemental data converter 502 is configured to transform the data using SCALA but other suitable programs can be used.

Figure 6A:
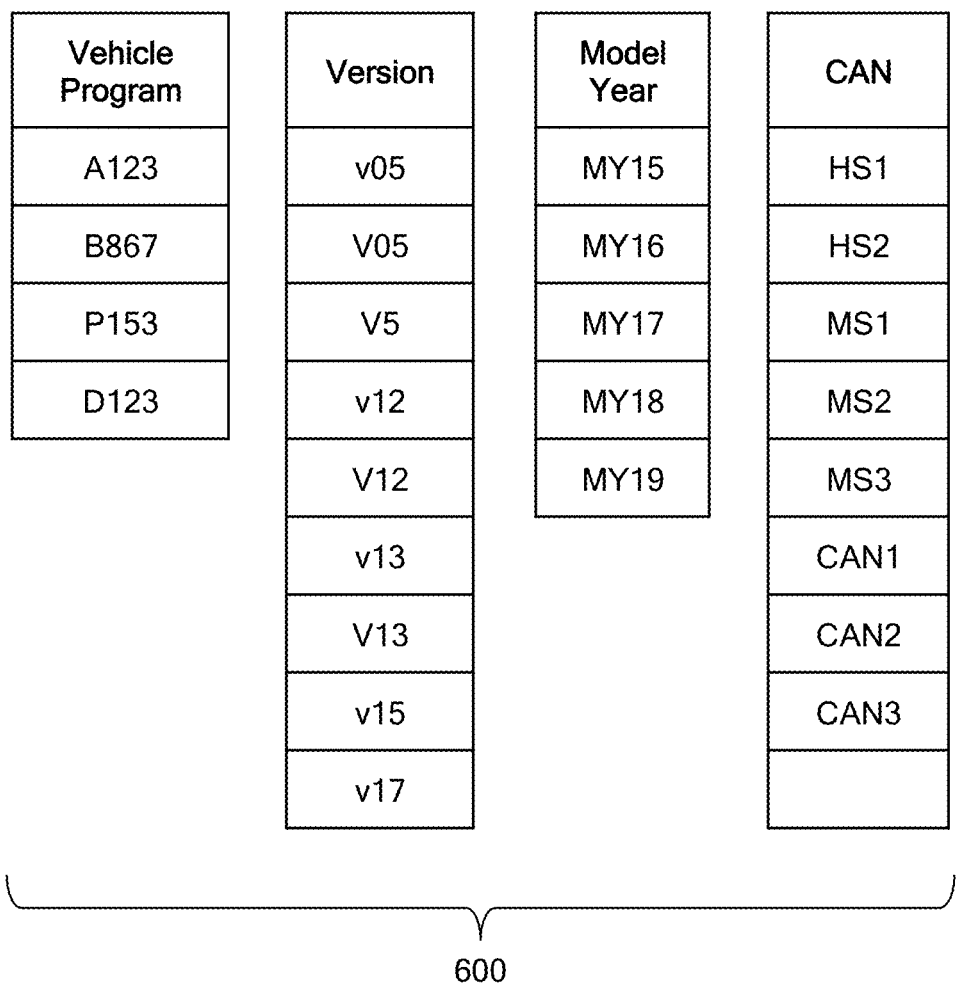

The vehicular file decoder 504 parses and restructures the data provided in the vehicular files 310 to make the data searchable. The vehicular file decoder 504 includes a DBC process module 510, a vehicular data dictionary 511, a diagnostic process module 512, and a processed file exporter 513. The DBC process module 510 includes a DBC metadata module 512, a DBC object generator 514, and a DBC pairing module 516. Similar to the abbreviation dictionary, the vehicular data dictionary 511 defines various terms and/or character strings indicative of the decoding logic provided in the vehicular files. For example, FIGS. 6A and 6B illustrate an example of a vehicular data dictionary 600 that defines different terms and identifies different character strings that are indicative of data (e.g., messages and/or signals) provided within the vehicular files. In particular, FIG. 6B defines possible entries for different fields of a message. A similar set of definitions is provided for signals and diagnostic data.

The vehicular data dictionary 600 also includes variations of a given term that address, for example, case sensitivity and numerical variation (e.g., leading zeros). For instance, as demonstrated in the "version" table, the dictionary 600 stores capital and lower case values, and even values having one or more leading zeros to identify, for example, "v005" and V05" as versions. The vehicular data dictionary can include other information and can be configured in other suitable ways and should not be limited to the look-up table illustrated in FIGS. 6A and 6B.

The DBC metadata module 512 is configured to extract the filename of the DBC file and process the metadata of the DBC filename (i.e., file metadata) to identify the different type of information represented. In one form, the DBC metadata module 512 splits the file metadata into one or more tokens and then associates the tokens with a field that is represented in the file metadata. For example, in one form, the file metadata includes fields that are indicative of at least one of vehicle program, the model year, the CAN bus, and version. Using the vehicular data dictionary 511, the DBC metadata module 512 identifies the field and the metadata for each field, and further assess whether the DBC filename contains all the fields. Specifically, if the DBC filename is configured to includes information indicative of a vehicle program, model year, CAN bus, and/or version, the module 512 determines given DBC filename is missing one of the fields. If a field is missing, the module 512 flags the DBC filename as missing a field and identifies the missing field. Once all the DBC files are processed, the DBC metadata module 512 generates a report identifying the DBC files having a missing field, which can be reviewed by an operator of the vehicular file decoder 504.

The DBC object generator 514 parses the DBC file to extract the CAN decoding information and pairs it with metadata for search. In one form, the DBC object generator 514 is configured to read the data in the DCB file line-by-line. Using the vehicular data dictionary 511, the DBC object generator 514 identifies data strings indicative of DBC instruction, message decoding instruction, and the signal decoding instructions, and further identifies one or more fields associated with the data strings. For example, in MSG1 provided above, the parsed data string may include "BO", "500", "VehicleStatusMessage", "8", and "ECU". These data strings are values for specific fields that make up the message decoding instruction. More particularly, "BO" is a value for the message indicator, "500" is the value for the message identification, "VehicleStatusMessage" is the value for the message name, "8" is the value for the message length, and "ECU" is the value for the originating ECU. Using the identified field and values, the DBC object generator 514 creates objects that are categorized as DCB (i.e., the entire DBC file with high-level message information), message, or signal.

With the decoding information extracted and categorized, the DBC pairing module 516 pairs the categorized objects with source information. More particularly, in one form, each categorized object is paired with respective filename metadata. The DBC pairing module 516 may also be configured to pair the categorized object with additional data, such as file path, that can be useful to uniquely identify and find the categorized objects from the DBC object generator 514 with the metadata provided from the DBC metadata module 512.

Figure 7:
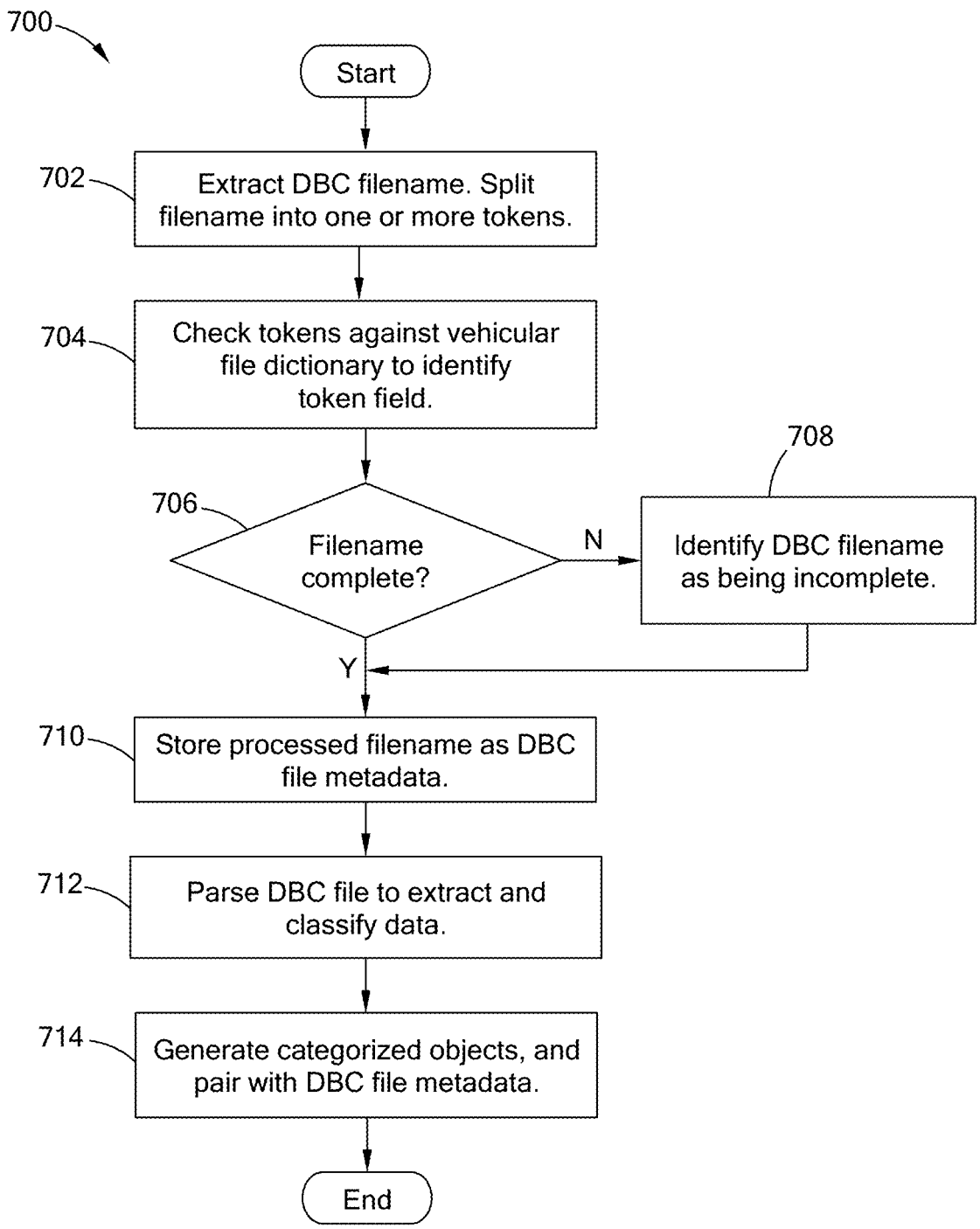
FIG. 7 is a flowchart of a DBC file process routine in accordance with the teachings of the present disclosure.

Referring to FIG. 7 an example DBC file process routine 700 that is executed by the DBC process module 510 when one or more DBC files are received. At 702, the module 510 extracts the filename of a DBC file and splits it into one or more tokens. At 704, the module 510 checks the tokens against the hic to identify the field of the token. For example, a token having character string "B867" is identified as the vehicle program. At 706, the module 510 determines whether the filename is completed. In other words, the module 510 determines whether the file metadata includes all the fields that define a desired DBC filename. For example, if the DBC filename is to include the model year, but the tokens representing the file metadata do not match a model year entry specified in the vehicular data dictionary, the DBC filename is considered incomplete. If incomplete, at 708, the module 510 identifies the DBC filename as being incomplete. If the filename is incomplete or after the filename is identified as being incomplete, the module 510, at 710, stores the processed filename as a DBC file metadata.

At 712, the module 510 parses the DBC file to extract and categorize the data within the DBC file. For example, using the vehicular data dictionary, the module 510 determines the portions of the DBC file that is indicative of DBCs, messages, and signals. At 714, the module 510 generates categorized objects, such as DBC objects, message objects, and signal objects, and then pairs the objects with the DBC file metadata. In addition, the module 510 outputs a report identifying incomplete DBC filenames if applicable. The DBC file process routine 700 is just one example of the process performed by the DBC process module 510. The DBC process module 510 may be configured in other suitable ways, and should not be limited to routine 700 of FIG. 7.

Referring to FIG. 5, to process the diagnostic files, the diagnostic process module 512 includes an ECU identification (ECU ID) module 520, a diagnostic data extractor 522, and a diagnostic pairing module 524. The ECU ID module 520 is configured to identify the ECU, vehicle program, and the version of the diagnostic file, using the vehicular data dictionary 511. In one form, the ECU ID module 520 is configured to extract the filename of the diagnostic file and process the metadata of the diagnostic file (i.e., diagnostic metadata) to identify, for example, the model year, the vehicle program, version and/or the ECU. For example, if the ECU filename is configured in accordance with a predefined format, the ECU ID module 520 splits the filename into the associated fields provided in the format and identifies the metadata for each field. In yet another example, if the ECU filename is configured to include specific information that can be arranged differently, similar to the DBC metadata module 512, the ECU ID module 520 is configured to split the filename into tokens and identify the fields and the metadata for each field using the vehicular data dictionary 511.

The diagnostic data extractor 522 processes the diagnostic file to extract the DID, DTC, and RTN provided within the diagnostic file. For example, using the vehicular data dictionary 511, if the diagnostic file is an .MDX file, the diagnostic data extractor 522 reads the file, parses the XML, and extracts the diagnostic data (i.e., DID, DTC, and RTN). The diagnostic data extractor 522 generates DID objects, DTC objects, and RTN objects from the extracted data, as categorized objects (i.e., diagnostic object).

The diagnostic pairing module 524 pairs the categorized objects with the information identifying the ECU, the vehicle program, and/or model year related to the diagnostic data. Accordingly, the DID objects, DTC objects, and RTN objects are linked back to the respective ECU.

Figure 8:
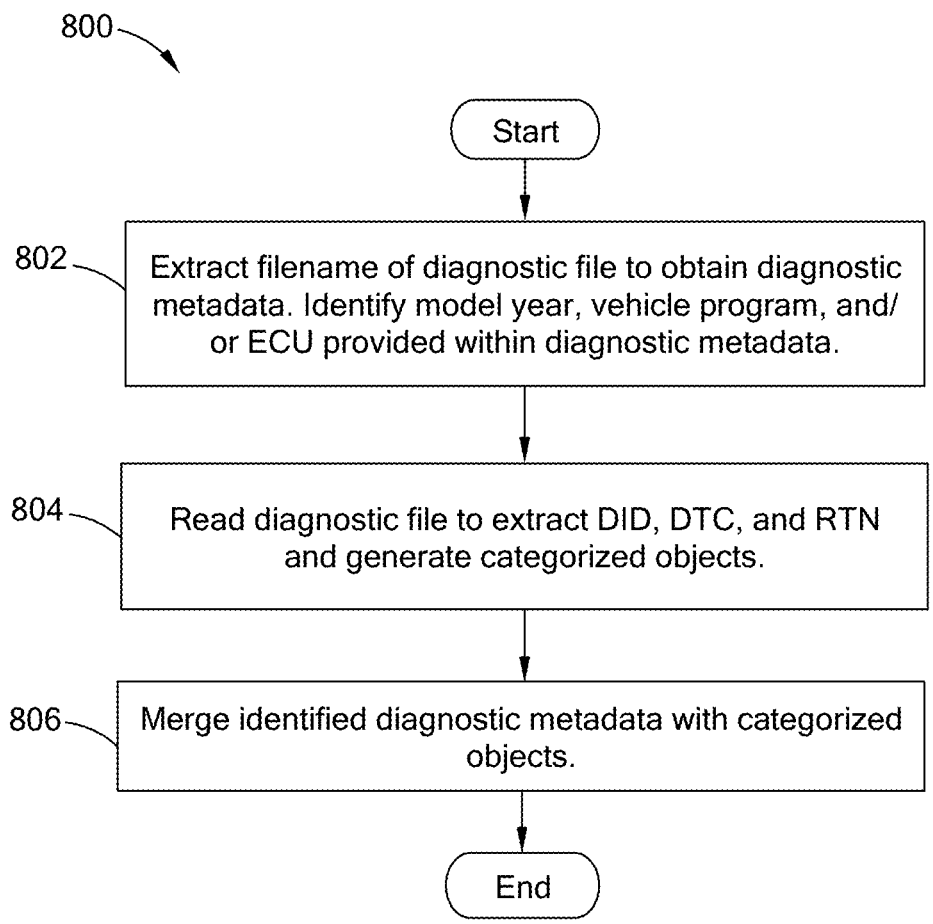
FIG. 8 is a flowchart of a diagnostic file process routine in accordance with the teachings of the present disclosure.

Referring to FIG. 8, an example diagnostic file process routine 800 is performed by the diagnostic process module 512 when diagnostic files are acquired to extract DID, DTC, and RTN data. At 802, the module 512 extracts the filename of the diagnostic file to obtain diagnostic metadata. The module 512 then identifies the model year, vehicle program, and/or ECU within the metadata. At 804, the module 512 reads diagnostic file to extract DID, DTC, and RTN and then generates categorized objects (e.g., DID objects, DTC objects, and RTN objects). To link the objects with their source, the module 512 merges the identified diagnostic metadata with categorized objects or in other words, pairs the diagnostic metadata with the categorized objects.

The processed file exporter 513 receives the categorized objects from the DBC process module 510 and the diagnostic process module 512, and is configured to standardize the format of the categorized objects to have it transmitted and stored by the search server 304. In one form, the processed file exporter 513 is configured to convert the categorized objects in JavaScript Object Notation (JSON), which represents the categorized object in human-readable text. The processed file exporter 513 is configured with information that identifies the receiver of the data (e.g., search server 304). In one form, the processed file exporter 513 utilizes representational state transfer (REST) APIs to programmatically upload the data to a database of the search server 304, and database command syntax is used within the processed file exporter 513 using a client library.

The search server 304 is configured to perform a search of a database system holding data indicative of the DBC files and the diagnostic files based on a query. Various search platforms/protocols, such as ELASTICSEARCH and APACHE SOLR, may be used to implement the search server 304. In one form, the search server 304 is configured to enhance the original data provided in the categorized object with supplemental information to allow natural language search of the original data.

Figure 9:
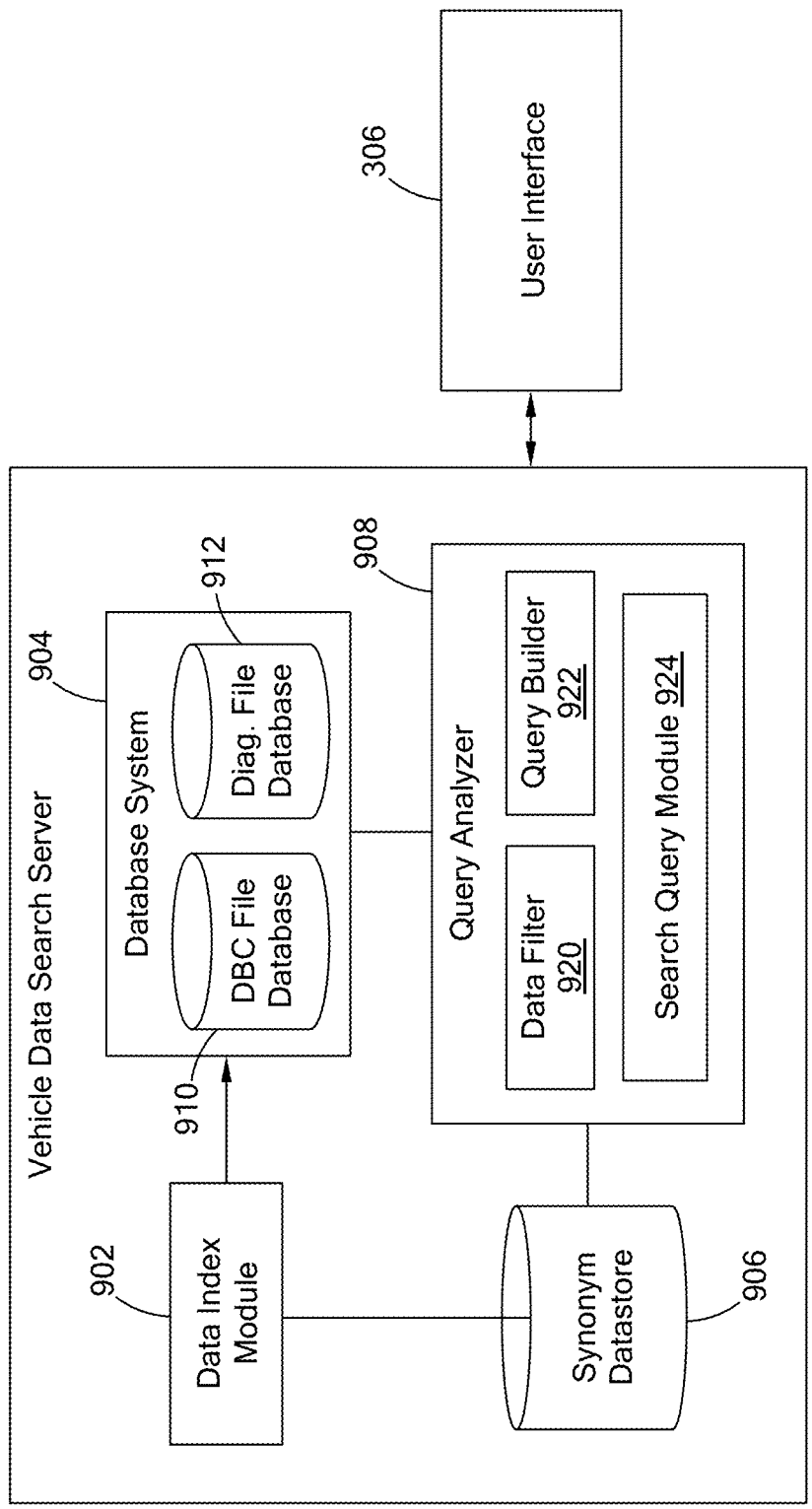
FIG. 9 is a block diagram of a search server in accordance with the teachings of the present disclosure.

Referring to FIG. 9, in one form, the search server 304 includes a data index module 902, a database system 904, a synonym datastore 906, and a query analyzer 908. In one form, the data index module 902 may include one or more databases for receiving the categorized object. For example, each group of classified objects may be stored in a separate database table provided in the data index module 902.

The data index module 902 is configured to associate or in other words, indexes the categorized objects with additional tags to enhance the search ability of the original object. For example, "VehicleStatusMessage" represents a message name, and without the additional tags, is only retrieved if the exact character string is provided (i.e., VehicleStatusMessage). In one form, the data index module 902 indexes the original data "VehicleStatusMessage" with additional tags, such that the original data is retrieved if a user enters, for example, "Vehicle Status" or "status."

To do this, the data index module 902 searches for additional tags using the synonym datastore 906. The synonym datastore 906 is populated with the data from the supplemental data converter 502. Specifically, the supplemental information includes information indicative of the vehicle program identifier 312, the abbreviation dictionary 314, and the base converter 316. For example, FIG. 10A provides examples of abbreviations with an associated synonym(s), and FIG. 10B provides examples of vehicle program identifiers that associate the program nomenclature with possible variations. Accordingly, the synonym datastore defines synonyms for data provided in the DBC files and the diagnostic files.

In one form, the data index module 902 indexes the categorized objects based on the field of the object. For example, a message provided in a DBC file is associated with the following fields: message indicator, message identification, message name, message length, and originating ECU. If the original character string provided in the object is a message name, the data index module 902 separates the string into one or more tokens based on, for example, camelcase. Using the synonym datastore, the data index module 902 assess if one or more synonyms are available for the token, and associates or indexes the token with the identified synonym. In another example, if the character string is a message ID, the data index module 902 associates the message ID with a synonym for its hexadecimal value, and in another example, if the character string is the message lengths, the data index module 902 does not associate the string with a value. The data index module 902 indexes each of the objects based on the field of the object and stores the original data in the database system in association with the synonym, as a vehicle document. Accordingly, the original vehicular data, such as the message id "VehicleStatusMessage" is indexed with additional tags to find the original data, and is stored in the database system as a vehicular document.

Figure 11:
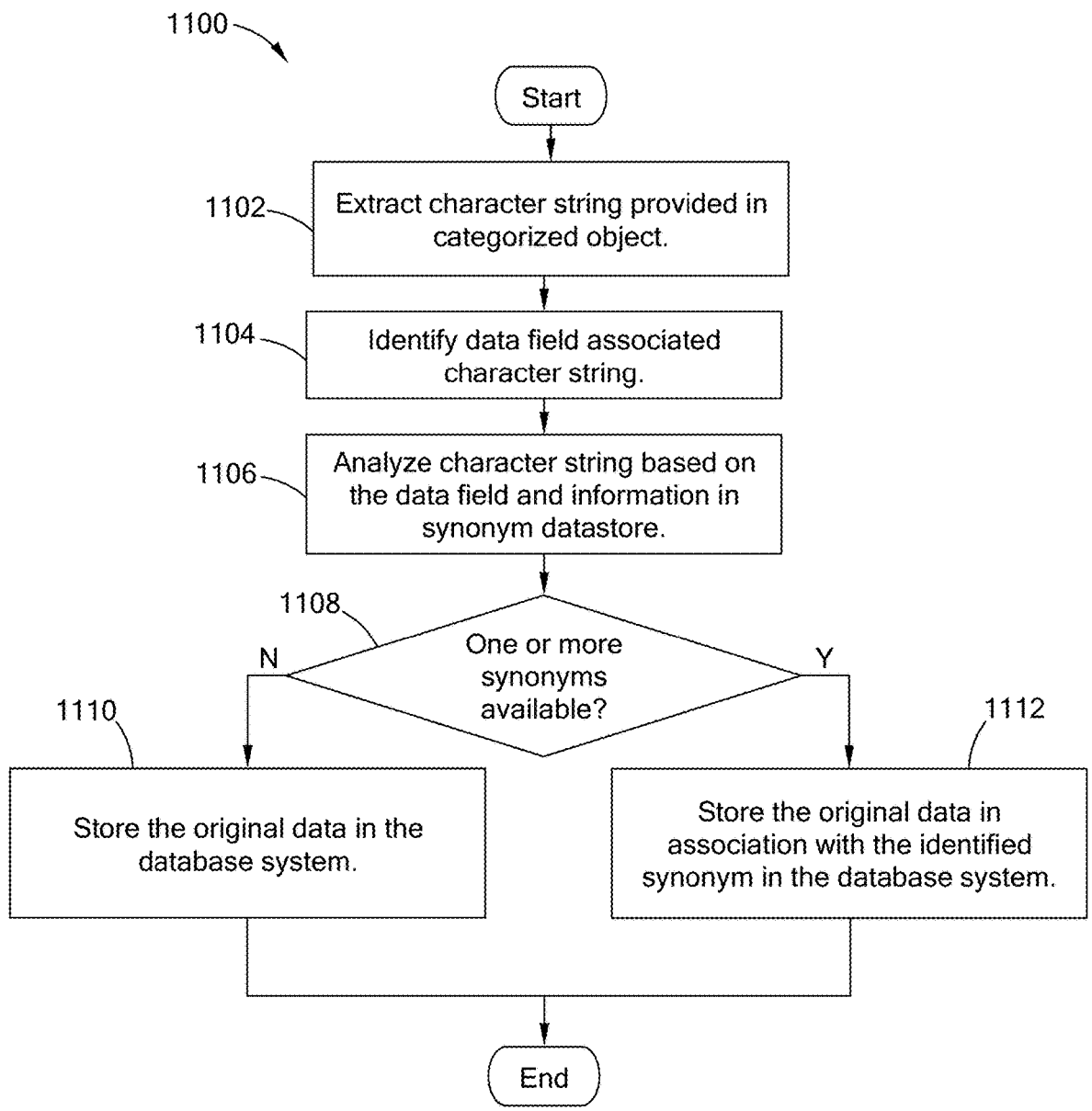
FIG. 11 is a flowchart of a data analyzer routine in accordance with the teachings of the present disclosure.

Referring to FIG. 11, an example data analyzer routine for indexing the categorized objects is provided. The data index module 902 is configured to perform the routine for each categorized object received. At 1102, the module 902 extracts the character string provided in the object, and at 1104, identifies the data field associated with the character string. For example, in one form, each object includes data that identifies a field (e.g., message name, signal, DTC, DID, etc.), and a value. Based on the data field, the module 902 analyzes the character string at 1106, and determines whether one or more synonyms are available, at 1108. For example, if the data field is a message name, the module 902 is configured to break the character string into tokens and then compare each token to the information in the synonym datastore to determine if the token can be associated with a synonym. If no synonyms are available, the module 902 stores the original data (i.e., categorized object) in the database system, at 1110. If one or more synonyms are available, the module 902 stores the original data in association with the identified synonyms in the database system, at 1112. For example, if the token is FX20 indicative of a vehicle program, the module 902 identifies the following as synonyms for the FX20: Ranger, 2005 FX20, ranger, RANGER. Each synonym is indexed with the original data (i.e., categorized object), and the original data is stored in the database system in association with the synonyms.

The database system 904 includes one or more database that store the data analyzed from the data index module 902, and more particularly, stores data based on the vehicular file. For example, in one form, the database system 904 includes a DBC file database 910 and a diagnostic (Diag.) file database 912. The DBC file database 910 stores data related to DBC files, such as message, signals, and the actual DBC. The diagnostic file database 912 stores data related to the diagnostic files, such as DID, DTC, and RTN.

The query analyzer 908 performs a search of the data stored in the database system based on search inputs provided by a user via the user interface 306. In one form, the query analyzer 908 includes a data filter 920, a query builder 922, and a search query module 924. The database filter 920 filters data based on one or more search filters for identifying search parameters to be searched. In one form, the search filter includes a search category filter that identifies a type of vehicular file to be searched. Other filters may include but are not limited to vehicle program, ECU, model year. In one form, the data filter 920 identifies entries provided in the database system 904 that correlate to the search parameters selected. For example, if the search category filter is indicative of vehicular networks, the data filter 920 identifies the data within the DBC database 910 as matching the search parameter selected. Alternatively, if the search category filter is indicative of a DTC, the data filter 920 identifies DTC files stored in the diagnostic database 912 as matching the search parameter.

The query builder 922 is configured to construct a search query to be executed by the search query module 924. In one form, the query builder 922 receives one or more keywords or search terms entered by a user via the user interface 306. Using the synonym datastore 906, the query module 924 identifies additional terms provided within the synonym datastore 906 that are related to the keywords and are used to expend the query to be searched. For example, the keyword may include "engine control unit", and synonym datastore 906 includes the following synonym for the keyword: "ECU", "ECM", and "engine control module." The query builder 922 supplements the original keyword with the identified synonyms to expand the query. In another example, if the keyword entered is "Focus", the query builder 922 supplements the original keyword with "AX07", "2005 AX07", "focus", and "FOCUS" (see FIG. 10B for associated synonym for a vehicle program). Accordingly, the query builder 922 expands the search terms for the query using the original keywords entered by the user.

The search query module 924 performs the search based on the identified filters from the data filter and the query built by the query builder. In one form, the search query module 924 reconciles the search terms provided by the query builder with the filtered data. More particularly, the search query module 924 may perform different types of queries, such as exact matching, partial match, and/or contains one or more search terms. Since the categorized objects in the database is associated with additional tags, the search query module 924 compares the search terms with not only the original data stored, but the tags, thus providing a more comprehensive search result.

In one form, the search query module 924 selects the results and the arrangement of the results based on a search score of the matching database entry. For example, the more often the search term(s) appear in the entry the higher the score (e.g., a term frequency). If the search terms match many entries, the lower the score for a match, and if the search terms appear in a shorter field, like a title, it receives a higher score. These are just some examples of how search results can be scored, and other suitable scoring methodologies may be used.

Once selected, the search query module 924 outputs the original data, and supplemental data indicative of one or more fields for identifying the data and data source. For example, for a search of the DBC files, the search query module 924 outputs the original data for each matching database entry, and also provides, supplemental data identifying the vehicle program, model year, message identification, and/or CAN bus. The additional fields provided in the search results may vary based on the vehicular file. In other words, search results from the diagnostic file database are different from that of the DBC file database. Furthermore, the search query module 924 may aggregate the results to provide result filters for further filtering the search results. In one form, the filters are based on the fields provided in the search results.

The query analyzer 908 exchanges information with the external computing device by way of the user interface 306, which is a graphical user interface displayed on the computing device 308. In one form, the user interface 306 includes query fields populated by a user, and text boxes for identifying different queries. For example, referring to FIGS. 12A and 12B, an example vehicular data search interface 1200 includes a header text box 1202 identifying the interface, a search bar 1204 (e.g., search input) for receiving one or more keywords, and a category filter section 1206 (e.g., search input) for selecting the type of vehicular data to be searched. Each category has a text box $1208_1$ to $1208_5$ (collectively 1208) to identify the category and a check box $1210_1$ to $1210_5$ to receive an input from user (collectively 1210). In one form, query analyzer 908 acquires the information provided by user when a search button 1212 is operated by the user. Alternatively, the query analyzer 908 may continuously receive the information populated in the interface 1200 and performs the search as the data is being populated.

Figure 12A:
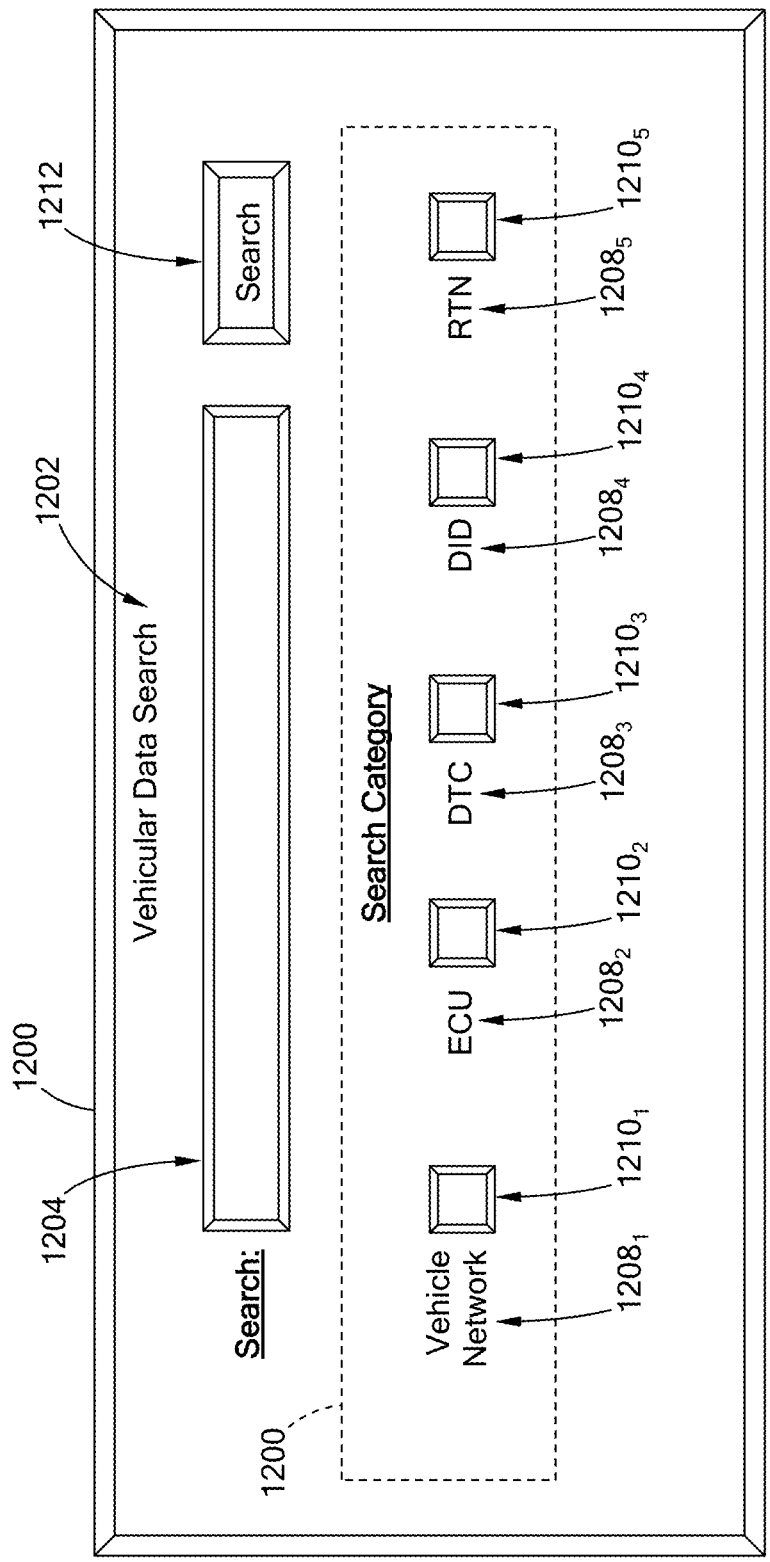
FIGS. 12A and 12B illustrate a user interface for the vehicular data search system in accordance with the teaching of the present disclosure.
Figure 12B:
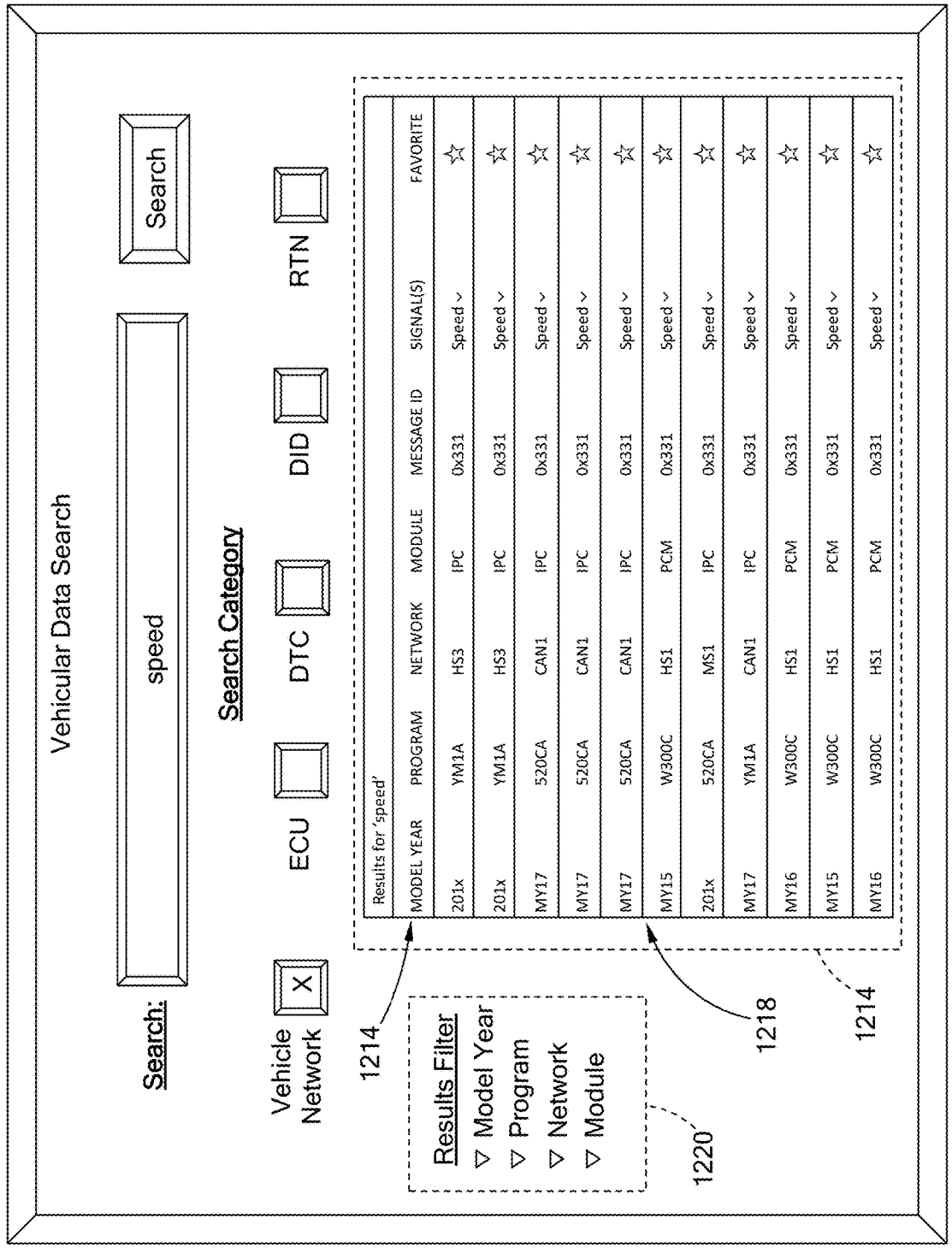

Once executed, the query analyzer 908 outputs search results that is displayed in a results section of 1214 of the interface 1200 (FIG. 12B). The results section 1214 includes a fields bar 1216 identifying various fields related to the keyword search, with a results box 1218 that provides the results of the query. In addition to the results, the query analyzer 908 outputs a results filter 1220 that allows the user to filter the results based on one or more of the fields. FIGS. 12A and 12B provide one example of a user interface 306. The user interface may be configured in other suitable ways and should not be limited to the interface depicted.

Figure 13:
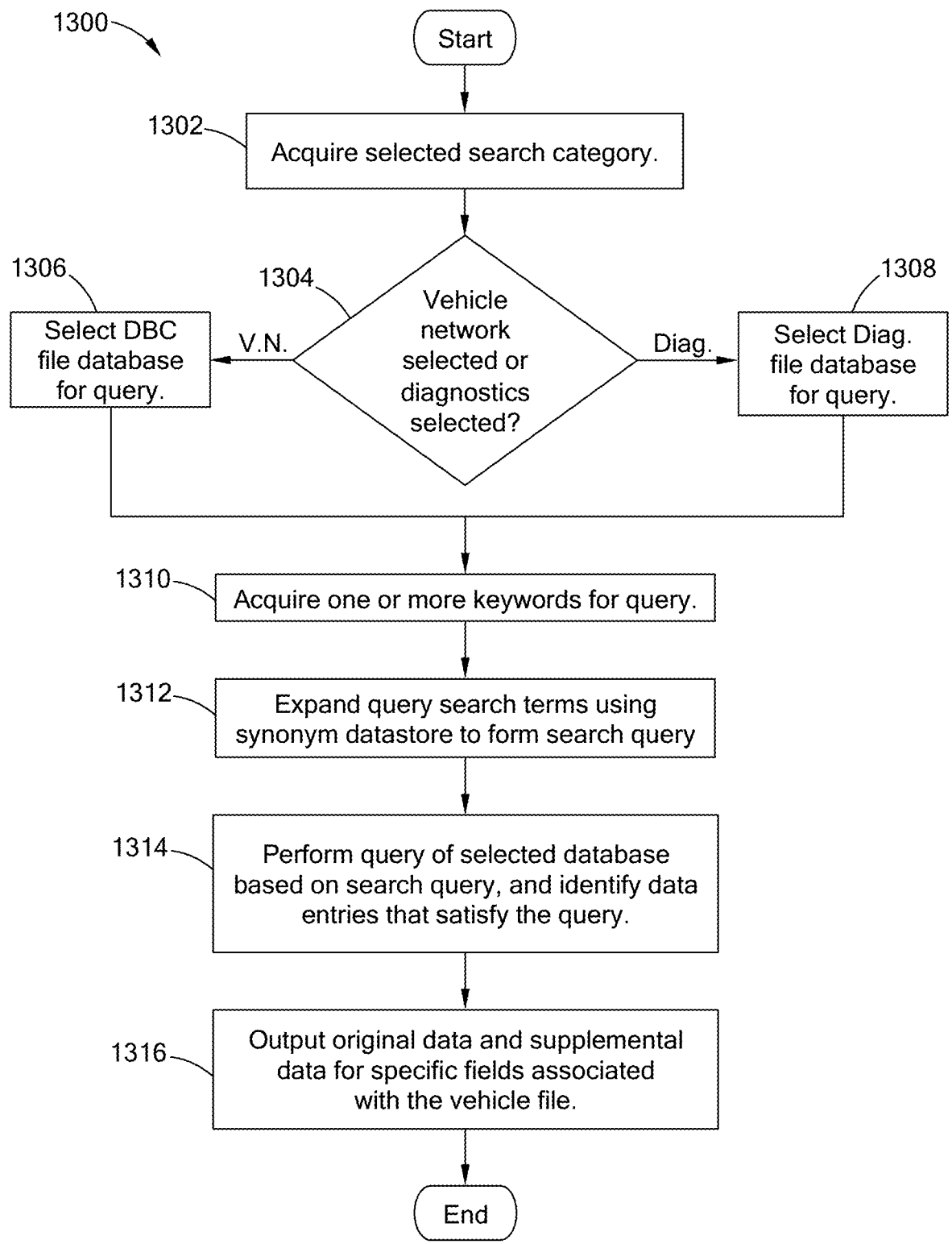
FIG. 13 is a flowchart of a search routine in accordance with the teaching of the present disclosure.

Referring to FIG. 13, an example search routine 1300 performed by the query analyzer 908 is provided. At 1302, the query analyzer 908 acquires the selected search category, which identifies the type of vehicular file to be searched. For example, referring to FIG. 12A, a user may select one of the search categories provided in the category filter section 1206. At 1304, the analyzer determines whether the vehicle network data is selected or the diagnostic data is selected. In one form, if vehicle network is selected in the category filter section, the query analyzer 908 selects the DBC file database for the query, at 1306. Alternatively, if one of ECU, DTC, DID, or RTN is selected, the analyzer 908, at 1308, selects the diagnostic files database for the query.

At 1310, the query analyzer 908 acquires one or more keywords for the query. For example, the analyzer 908 acquires the keywords populated in the search bar 1204 (e.g., "speed"). At 1312, the query analyzer 908 expands the query search terms using the synonym datastore. For example, term "speed" is also associated with "SPEED", "engine speed", "vehicle speed", and "RPM", and each term is added to the query to create a comprehensive search of the DBC file database. At 1314, the query analyzer 908 performs a query of the selected database based on the search query. More particularly, each categorized object is associated with tags or supplemental data to recall the original categorized object. Based on the query (e.g., exact match, partial match, contain, etc.), the query analyzer 908 reconciles the categorized object and the supplemental data with the search query which includes additional terms for expanding the search. At 1316, the query analyzer 908 outputs the results, which includes the original data for each matching categorized object, and fields specific to the vehicular file. For example, in FIG. 12B, the fields include the model year, vehicle program, CAN network, the module (i.e., ECU), message ID, and the signal. The query analyzer 908 can be configured in various suitable ways to expand the search query and reconcile the search query with the data in the database system.

The vehicular data search system of the present disclosure transforms vehicular decoding logic provided in vehicular files into searchable format to allow users, such as engineers, product development teams, to analyze vehicle data from one or more vehicles. The system ingests vehicular files (i.e., automotive engineering documents) with metadata to aggregate vehicle data points to be used for common vehicle interaction applications, such as diagnostics or decoding CAN traffic. The vehicular files are ingested at a granular level with metadata to enable flexible vehicle data extraction and interaction.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method comprising:
    extracting a vehicle filename metadata for one or more vehicular files, wherein each of the vehicular files are configured to provide decoding logic to decode encoded data packets indicative of vehicular data generated by one or more electronic control units (ECUs);
    parsing data of the vehicular files to generate categorized objects based on a vehicular data dictionary for the vehicular files, wherein the vehicular data dictionary defines multiple terms indicative of the decoding logic provided in the vehicular files;
    associating each of the categorized objects with a respective vehicle filename metadata;
    storing vehicular documents indicative of the categorized objects with associated vehicle filename metadata in a database system;
    building a query based on a search input acquired by way of a search interface being displayed; and
    transmitting search results in response to the search input;
    wherein the one or more vehicular files includes a network protocol file to decode messages transmitted on a vehicle network, and the data of the network protocol file is parsed to generate protocol objects, message objects, and signal objects, as the categorized objects.

2. The method of claim 1 further comprising, for each of the categorized object, indexing original data provided in a categorized object with one or more searchable terms provided in a synonym datastore that defines terms provided in the vehicular files, wherein the original data with the indexed searchable terms are stored as a vehicular document in the database system.

3. The method of claim 1, wherein the one or more vehicular files includes a diagnostic file to define diagnostics performed by a given ECU among the one or more ECUs, and the data of the diagnostic file is parsed to generate data identifiers (DID) objects, diagnostic trouble code (DTC) objects, and diagnostic routine (RTN) objects, as the categorized objects.

4. The method of claim 1, wherein the vehicular data dictionary includes information regarding at least of following fields provided in the vehicular files: make and model of vehicle; the vehicle network; version of vehicular file; electronic control units provided in the vehicle; message identification; message name; message length; and signal name.

5. The method of claim 1, wherein the database system includes a plurality of databases, and the search input includes a search category filter input to select a database from among the plurality of databases and one or more keywords, wherein the searching the database system further comprises searching a selected database from among the plurality of databases using the one or more keywords.

6. The method of claim 1, wherein the vehicle filename metadata includes at least one of data indicative of the vehicle network the vehicular data is transmitted on, and information identifying the vehicle having the vehicle network.

7. The method of claim 1 further comprising:
    splitting the extracted vehicle filename metadata in one or more tokens;
    identifying a field for one or more of the tokens using the vehicular data dictionary; and
    saving the file metadata in association with the fields identified for each of the tokens in the database system.

8. A non-transitory computer readable medium storing program instructions, that when executed by a processor of computing device, cause the computing device to perform a set of operations comprising the method of claim 1.

9. A method comprising:
    generating, by a vehicular data search system, a vehicle file database system to store vehicular documents, wherein each of the vehicular documents provides decoding logic to decode encoded data packets indicative of vehicular data generated by at least one electronic control unit (ECU), wherein each of the vehicular documents include at least one of vehicle network documents or vehicle diagnostic documents, wherein the vehicle network documents are based on at least one network protocol file that decodes vehicular data transmitted on at least one vehicle network, and the vehicle diagnostics documents are based on at least one diagnostic file that defines diagnostics performed by the at least one ECU in a given vehicle;

acquiring, by the vehicular data search system, one or more keywords from a search bar being displayed by the vehicular data search system;

constructing, by the vehicular data search system, a query that includes the keywords and at least one synonym from a synonym datastore for the acquired keyword, wherein the synonym datastore defines synonyms for vehicular data provided in the network protocol file and the diagnostic file;

searching, by the vehicular data search system, the vehicular documents stored in the vehicle file database system based on the constructed query;

outputting, by the vehicular data search system, one or more search results in response to the keywords; and parsing, by the vehicular data search system, the network protocol file based on a vehicular data dictionary to generate vehicle network objects that include protocol objects, message objects, and signal objects, wherein the vehicular data dictionary defines multiple terms indicative of decoding logic provided in the network protocol file and the diagnostic file.

10. The method of claim 9, wherein the generating the vehicle file database system further comprises:

parsing, by the vehicular data search system, the one or more diagnostic files based on the vehicular data dictionary to generate vehicle diagnostic objects that include at least one of data identifiers (DID) objects, diagnostic trouble code (DTC) objects, and diagnostic routine (DRTN) objects.

11. The method of claim 10, wherein the generating the vehicle file database system further comprises:

extracting, by the vehicular data search system, filename metadata for the network protocol file and the diagnostic file;

pairing, by the vehicular data search system, the extracted filename metadata of the network protocol file with the respective vehicle network objects; and pairing, by the vehicular data search system, the extracted filename metadata of the diagnostic file with the respective vehicle diagnostics objects.

12. The method of claim 11, wherein the generating the vehicle file database system further comprises:

for each of the vehicle network objects, indexing, by the vehicular data search system, original data provided in a vehicle network object with one or more searchable terms provided in the synonym datastore, wherein the original data with the indexed searchable terms is stored as a vehicle network document in the database system; and for each of the vehicle diagnostic objects, indexing, by the vehicular data search system, original data provided in a vehicle diagnostic object with one or more searchable terms provided in the synonym datastore, wherein the original data with the indexed searchable terms is stored as a vehicle diagnostics document in the database system.

13. The method of claim 12, wherein the searching the vehicular documents further comprises reconciling, by the vehicular data search system, the query with the searchable terms provided in the vehicular documents to select one or more relevant vehicular documents, wherein the search results include the original data provided in the one or more relevant vehicular documents.

14. The method of claim 9, wherein the vehicle file database system includes a network database for storing the vehicle network documents and a diagnostic database for storing the vehicle diagnostics documents, the method further comprising:

acquiring, by the vehicular data search system, a search category filter input to identify one of the network database or the diagnostic database as a desired database, wherein the searching the vehicular documents further comprises searching, by the vehicular data search system, the vehicular documents stored in the desired database based on the constructed query.

15. A non-transitory computer readable medium storing program instructions, that when executed by a processor of computing device, cause the computing device to perform a set of operations comprising the method of claim 9.

16. A vehicular data search system comprising:

a vehicular file decoder configured to generate categorized objects of a vehicular file, wherein the categorized object includes vehicular data parsed from the vehicular file and is paired with data indicative of a vehicle filename metadata, wherein the vehicular file provides decoding logic to decode encoded data packets indicative of vehicular data generated by one or more electronic control units (ECUs); and a vehicular data search server communicably coupled to an external computing device to receive a search input, wherein:

the vehicular data search server includes a database system that stores a vehicular document for each categorized object and a synonym datastore that defines synonyms for data provided in the vehicular file, and each vehicular document includes vehicular data from the vehicular file and is indexed with one or more searchable term provided from the synonym datastore; and the vehicular data search server, in response to receiving a keyword as the search input, is configured to build query, search the database system based on the query, and output search results, wherein the query includes the keyword and at least one synonym from the synonym datastore for the acquired keyword, wherein the vehicular file includes a network protocol file to decode data transmitted on a vehicle network, and the vehicular file decoder is configured to parse the data of the network protocol file and to generate protocol objects, message objects, and signal objects, as the categorized objects.

17. The vehicular data search system of claim 16, wherein the vehicular file includes a diagnostic file to define diagnostics performed by a given electronic control unit (ECU) in a vehicle, and the vehicular file decoder is configured to parse the data of the diagnostic file and to generate data identifiers (DID) objects, diagnostic trouble code (DTC) objects, and diagnostic routine (DRTN) objects, as the categorized objects.

18. The vehicular data search system of claim 16, wherein the vehicular file decoder outputs the categorized objects in JavaScript Object Notation (JSON).

* * * * *